United States Patent Office 3,441,023
Patented Apr. 29, 1969

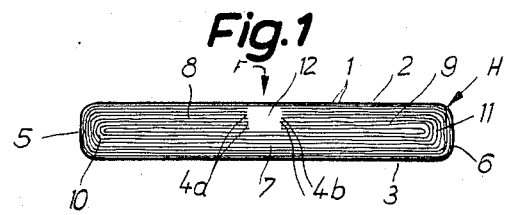
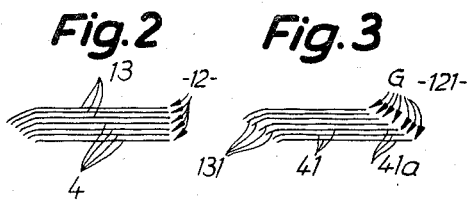
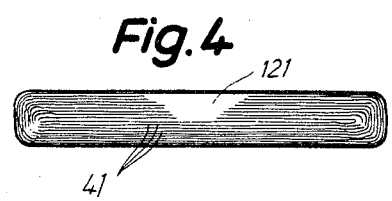
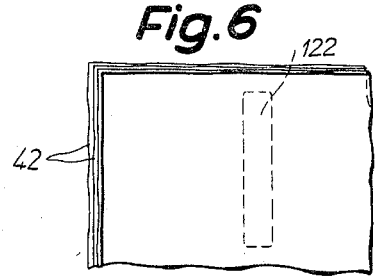
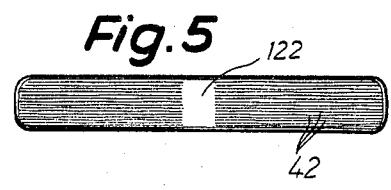
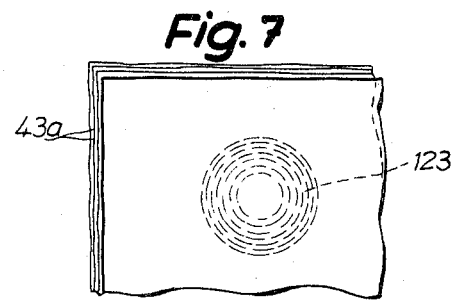
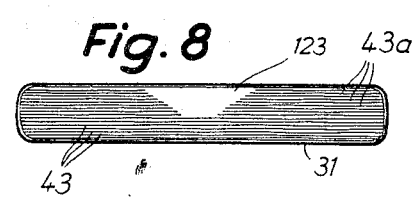
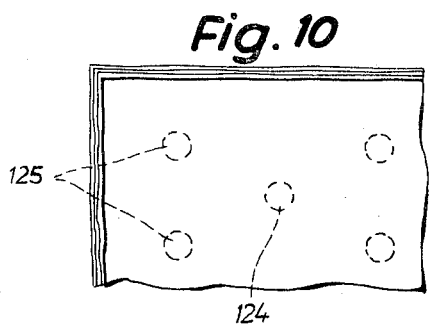
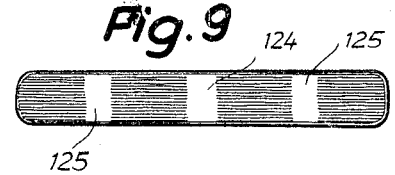
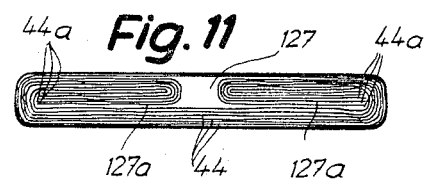

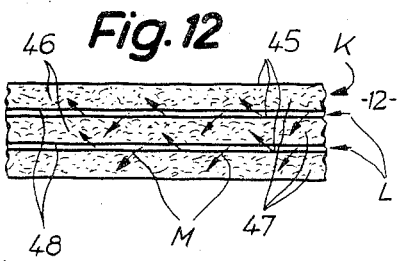
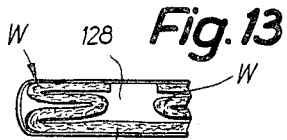
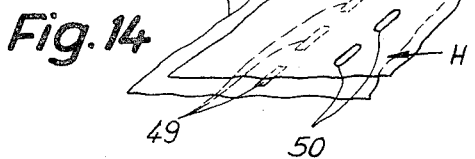
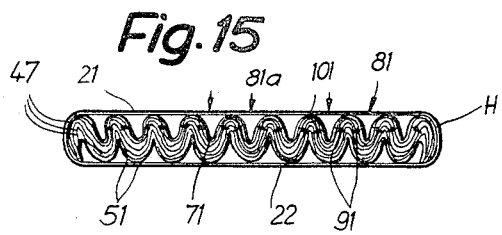
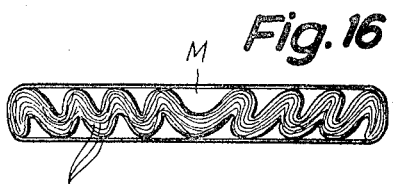
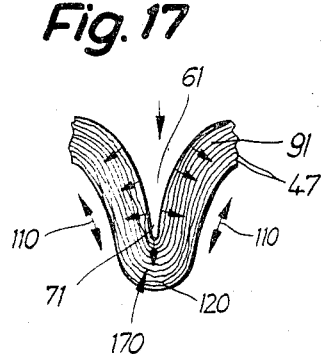
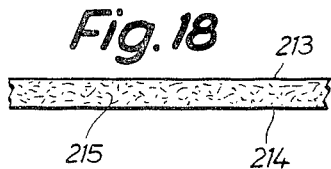
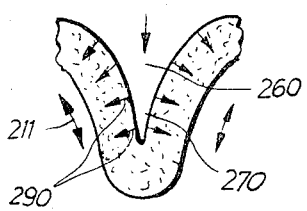

3,441,023
ABSORPTION PAD FOR THE TREATMENT OF
WOUNDS AND FOR INFANT CARE
Robertus Cornelis Johannes Maria Rijssenbeek, Nijmegen,
Netherlands, assignor to Page Zellstoffkrepp G.m.b.H.,
Dusseldorf, Germany
Filed Feb. 11, 1966, Ser. No. 526,884
Claims priority, application Germany, Feb. 12, 1965,
P 36,058, P 35,059; Mar. 24, 1965, P 36,360
Int. Cl. A61f *13/00*
U.S. Cl. 128—287                      12 Claims

ABSTRACT OF THE DISCLOSURE

An absorption pad, especially for the treatment of wounds and for infant care, which includes an outer cover of moisture resistant material one side of which is liquid permeable and has adjacent thereto a cavity partially formed by said cover and partially by superimposed layers of moisture absorbing cellulose material which layers define capillary passage means extending from said cavity toward the side walls of the pad between and into said layers of moisture absorbing cellulose material.

---

The present invention relates to an absorption pad for the treatment of wounds and for infant care, said pad substantially comprising an outer moisture resistant cover or envelope and a plurality of layers of cellulose wadding and/or cellulose flakes. The moisture resistant cover in addition to holding together the layers in the interior of the pad also prevnts crumbling of the wet cellulose wadding in the cover.

Heretofore known absorption pads of the above mentioned type have various deficiencies. Thus, for instance, when layers of cellulose wadding are employed, the pad has an insufficient absorption ability with regard to a sudden occurrence of liquid. This is due to the fact that the liquid has to pass through the individual cellulose wadding layers as if it has to pass through serially arranged filters. Consequently, the liquid when occurring suddenly does not enter the pad but flows all over the pad and out of the pad at the marginal portions thereof. In view of the filter property of the layers, filtered portions remain at the surface of the pad on the side of use thereof.

When the filling of the pad consists of cellulose flakes, especially during a sudden occurrence of liquid, a lumping of the flakes and thus a formation of free spaces between said lumps will occur. These lumps make the pad uncomfortable to wear and may even cause sores when the part of the body covered by said pad carries out movements. The liquid can pass through the free spaces around said lumps and in this way will pass to the oppositely located bottom side of the pad without distributing itself over the entire pad inasmuch as the lumps no longer exert a bar to the liquid.

It is, therefore, an object of this invention to provide an absorption pad which will have a good absorption ability even during a sudden occurrence of liquid and when smaller quantities of liquid flow continuously into the pad.

It is still another object of this invention to provide a pad as set forth in the preceding paragraph, in which all sections of the pad will be able to absorb liquid so that the absorption ability of the pad will be considerably greater than the absorption ability of heretofore known pads of the type involved.

These and other objects and advantages of the invention will appear more clearly from the following specification in connection with the accompanying drawings, in which:

FIGS. 1 to 14 illustrate embodiments with the layers substantially parallel to each other, whereas FIGS. 15 to 19 illustrate an absorption pad according to the invention in which the layers are substantially at a right angle to the surface of the cover.

More specifically, FIG. 1 illustrates a first embodiment in which the layers of cellulose wadding have their end portions bent inwardly toward each other.

FIGS. 2 and 3 indicate the penetration of the liquid from a collecting space between the parallel layers.

FIGS. 4 to 11 represent further embodiments of the invention and differ from the embodiment of FIG. 1 with regard to the arrangement of the layers and the liquid receiving spaces between the ends of the parallel layers.

FIGS. 12 and 13 represnt an embodiment of the invention with a plurality of cellulose flake layers.

FIG. 14 shows a cover which has an increased liquid permeability at the level of the layer-free sections.

FIGS. 15 and 16 illustrate embodiments of the invention in which the layers within the pad cover follow a more or less corrugated path.

FIG. 17 shows a detail with regard to the invention.

FIGS. 18 and 19 illustrate the structure of a cellulose flake layer with two cellulose wadding layers.

The objects of the present invention have been realized by an absorption pad according to the present invention which comprises an outer moisture resistant cover and a plurality of layers of cellulose flakes or cellulose wadding and which is characterized primarily by one or more layer-free sections which extend entirely or partially from the top side of the cover to the bottom side of the cover which bottom side is the side which will face and cover the respective body part. The layer-free sections may be so designed and arranged that when the layers are parallel to the surface of the cover, the intermediate spaces betwen said layers lead into the layer-free section, or the layers, in most instances a plurality of layers combined, form the layer-free space between their surfaces.

With the first mentioned arrangement, the present invention results in an absorption pad with a substantially uniform and fast distribution of the liquid over the entire pad. In this way, also the capillarity of the material, in other words the absorption ability of the individual layers, will be taken advantage of to a great extent. During a sudden occurrence of liquid, the liquid enters the cover which preferably at the level or in the neighborhood of the free sections has portions of greater liquid permeability than the adjacent portions, and the liquid passes into the liquid receiving spaces from where it is withdrawn quickly between the layers of the intermediate spaces.

When the layers are parallel to the surface of the cover, the layer-free sections may partially or entirely extend over the length or the width of the pad. The shape of the layer-free sections may be selected in conformity with requirements and may for instance be of a square or rectangular contour or may be round or oval. The layer-free sections can be formed by stamping out the respective spaces from the cellulose wadding or the cellulose flake layers.

Some of the layers confining the layer-free sections may be supplemented by further parallel layers having no layer-free sections. These additional layers confine the receiving space for the liquid, for instance toward the top side of the pad which means toward that side of the pad which is remote from the side facing and engaging the body. The arrangement of the layers may be such that the end portions of the layers are bent toward each other. It is also possible to laterally broaden the receiving space for the liquid and to have this broadening portion merge with the spaces between the layers. To this end, layers may be employed the two ends of which are folded twice while the folded-over ends then confine the receiving space for the liquid. With this embodiment, as well as with other embodiments, the layers may be connected to each other in order to assure their position in the cover. This connection may be effected in any convenient manner, for instance, by glueing, stitching, stamping, or the like.

According to a particularly advantageous embodiment of the present invention, employing layers parallel to the cover surface, the layer-free sections are formed by layers of cellulose wadding with cellulose flakes. Between at least two layers of cellulose wadding there may be arranged a layer of cellulose flakes. These layers of cellulose flakes, similar to the layer of cellulose wadding, confine the liquid receiving space or the layer-free section. From here liquid passes into the cellulose flake layer. However, the major portion of the liquid passes due to the capillary effect of the intermediate space between the adjacent layer of cellulose wadding and from here after penetrating the layers of cellulose wadding enters the adjacent cellulose flake layers.

According to the second advantageous embodiment of the invention in conformity with which the layers form the layer-free space between their surfaces, the layer or layers within the cover extend over the major portion of their length at a right angle or substantially a right angle with regard to the cover top and bottom side and form between said layers layer-free intermediate spaces. In this way the liquid is after passing through the cover of the pad prevented from hitting the layers at a right angle and thus encounters a certain resistance whereby the liquid is forced to distribute itself laterally. Due to the rectangular or nearly rectangular arrangement of the layers with regard to the top and bottom side of the cover, capillary unidirectional spaces or receiving spaces for the liquid are obtained which are distributed over the surface of the pad and from where the liquid is distributed into the layer or layers and can pass therethrough. In other words, the liquid is confined within the area where it is received and only subsequently thereto is distributed laterally.

The spaces between the layers are covered at one end thereof with regard to the cover of the pad so that the liquid can from said intermediate spaces pass only into the adjacent layers.

Preferably, with the last mentioned embodiment, the layers are arranged in a serpentine manner which in turn has the advantage of a simplified manufacture of the pad. The individual sections of the layers may be at a right angle with regard to the cover top or bottom side or may have a plurality of sections at different angles with regard to the cover top or bottom side or with regard to each other. Thus, the layers may from the center of the pad be inclined in opposite directions so that in the central portion of the pad there will be formed a particularly large receiving space for the sudden occurrence of liquid.

Preferably, the layers may be so designed that between an upper and a lower cover layer of cellulose wadding there is arranged an intermediate layer of cellulose flakes. The liquid may from the capillary spaces pass between adjacent layers of cellulose wadding into the layer of cellulose flakes where it will be distributed substantially uniformly. Of particular advantage is a pad filling which is composed of a plurality of layers of cellulose flakes of up to 200 grammes per square meter, which parallel cellulose flake layers are separated from each other by one or more layers of cellulose wadding. In this connection, the number of cellulose wadding layers and in particular of cellulose flake layers should be as high as possible which means that with a given weight of the pad, it is advisable to employ a maximum of layers of cellulose flakes. When the liquid penetrates the cover of the layer and enters the interior of the pad, first portions of the first cellulose flake layer are disintegrated but due to the minor thickness of the layer no large lumps are formed so that also relatively minute hollow spaces are formed around the lumps. After penetrating the first layer of cellulose flakes, the liquid reaches the layer of cellulose wadding between the first and second cellulose flake layer by a lateral distribution of the liquid. This distribution is particularly favorable when a plurality of cellulose wadding layers are arranged close to each other and thus form a capillary intermediate space through which the liquid is distributed perpendicularly with regard to the direction of entry of the liquid into the cellulose flake layer. When the liquid enters the second flake layer, it has already been distributed by the superimposed layer of cellulose wadding. In the second flake layer, lumps are again formed which, however, are now even smaller than the lumps of the first cellulose flake layer, said second flake layer likewise being rather thin. The hollow spaces surrounding the lumps of the last mentioned cellulose flake layer are thus even smaller than the hollow spaces around the lumps of the first cellulose flake layer so that even less liquid can in entering direction into the cellulose flake layers pass through the pad.

The lateral distribution of the liquid is effected substantially between the cellulose flake layers in the cellulose wadding layers or at both sides of said wadding layers. The farther the liquid penetrates into the pad, the smaller will the lumps become and the smaller will be the hollow spaces surrounding said lumps. Thus, a combination effect of thin cellulose flake layers with the adjacent cellulose wadding layers is obtained. The thin cellulose flake layers bring about the formation of only small lumps under the effect of moisture and liquid. The cellulose wadding layers between the individual cellulose flake layers bring about a favorable lateral distribution of the liquid in such a way that these layers act as a bar to the passage of liquid and thus act as lateral distributing means. In other words, due to the formation of small lumps, capillary spaces around the lumps are formed and furthermore between the layers of cellulose flakes bars are formed which force the liquid to distribute itself laterally.

Referring now to the drawings in detail, the pad shown therein comprises a cover H which may in a manner known per se consist of one or a plurality of layers of moisture resistant material. Cover H the shape of which may be square, rectangular, round or oval, is closed on all sides and has a bottom side 2 for facing and engaging a portion of the human body and also has a top side 3. The two sides 2 and 3 of the pad may, if desired, consist of different material while side 2 should be as moisture resistant as possible and should be liquid permeable. Side 2 may consist for instance of wide mesh gauze. Side 3 may be designed according to mechanical requirements, i.e., tear resistant, durable, etc.

Arranged in the interior of cover 1 is a plurality of layers 4 of cellulose wadding comprising a central section extending approximately from the bend 5 to the bend 6 and also comprising the marginal sections 8, 9 which are parallel to the central section 7. The marginal sections 8 and 9 are connected to the central section 7 at the folding lines 10, 11. The end portions 4a, 4b of the upper sections 8, 9 are so arranged as to confine therebetween a layer-free section 12 which serves as receiving space for the liquid which enters through cover H in the direction of the arrow F.

As will be seen from FIG. 2, the liquid after entering section 12 passes in view of the capillary effect of the intermediate spaces 13 between the individual layers 4 into said intermediate spaces and thus to the surface of the individual layers 4 of cellulose wadding. The arrangement of FIG. 4 differs from that of FIG. 1 in that instead of a cylindrical or rectangular or oval layer-free section 12 there is provided a layer-free section 121 of conical cross-sectional shape. The individual cellulose wadding layers 41 arranged one above the other are of different lengths. The ends 41a (FIG. 3) of layers 4 overlap so that the liquid can from intermediate space 121 pass not only from the side but also from the top into the intermediate spaces 131 between the layers 41.

Instead of employing layers with their ends folded over, it is also possible to employ layers having the length of the pad while in these layers there are provided corresponding layer-free sections 122. With this embodiment which is shown in FIG. 5, the individual layers 42 may be interconnected by stitching, gluing, or the like.

The design of the layer-free section may be selected in conformity with the respective requirements. As will be seen from FIG. 6, the layer-free section may for instance extend partially over the entire width of the pad.

In conformity with the embodiment of FIGS. 7 and 8, a conical layer-free section 123 is provided which with regard to the top side 31 of the pad is confined by layers 43 of cellulose wadding which layers 43 extend all the way through. The liquid will thus enter the layer-free section 123 but cannot pass up to the top side 31 of the pad but will enter the spaces between the layers 43a which form the layer-free section 123.

With the embodiment according to FIG. 9, the intermediate layer-free section 124 has associated therewith a plurality of layer-free sections 125 arranged on the same level. As illustrated in FIG. 10, the central section 124 may also have layer-free sections 125 laterally offset thereto.

According to the embodiment illustrated in FIG. 11, the layer-free section 127 first merges into a lateral intermediate space 127a which communicates with the ends 44a of layers 14 folded twice. Here the entry of the liquid into the intermediate spaces of the layers is delayed.

According to the arrangement of FIG. 12, each two or more layers 45 of cellulose wadding has interposed therebetween a layer 46 of cellulose flakes. The liquid passes from the layer-free section 12 or from the sections 121 to 127 of the other embodiments in the direction of the small bent arrows K into the sections 47 of the cellulose flake layers 46 which are adjacent to the layer-free section 12 but also passes into the spaces 48 between the adjacent wadding layers 45 (arrow L) and from there as indicated by the arrows M into the cellulose flake layers 46.

The cellulose flake layers may take any of the positions shown in FIGS. 1 to 11 and may be employed in the form of a plurality of superimposed layers but also as individual cellulose flake layers 461 as shown in FIG. 13. Also in this embodiment a layer-free section 128 is formed which is confined by the one layer winding W of the cellulose flake layer. The cellulose flake layer 461 may be rolled-in once as shown in connection with layers 44 in FIG. 11 but may also be rolled-in a plurality of times.

According to FIG. 14, an envelope H composed of two layers J and A is employed. The inner layer I has perforations 49 which have a liquid permeability which is greater than that of the adjacent areas. These perforations are provided at the level of the layer-free sections 12, 121 to 127 in the illustrated embodiments. Also the outer layer A of the envelope may be provided with perforations 50. The perforations 49 and 50 are offset with regard to each other in lateral as well as in vertical direction.

With the embodiments illustrated in FIGS. 12 and 13 and also with the embodiments of FIGS. 18 and 19, the layers formed of cellulose wadding with the intermediate layers of cellulose flakes are so designed that their total weight does not exceed 250 grammes per square meter.

Referring now to the embodiment of FIG. 15, the arrangement shown therein has the layers 47 arranged in a serpentine manner so that the respective straight sections 51 of the layers are located at a right angle or approximately right angle with regard to the top and bottom surfaces 21, 22 of the envelope. The major portion of the total length of layers 47 thus extends rectangularly or approximately rectangularly with regard to the top and bottom sides of the envelope. In view of this arrangement of layers 47, layer-free receiving spaces 61 with adjacent capillary spaces 71 are formed.

As will be evident from the above, the liquid enters the layer-free spaces 61 and capillary spaces 71 and enters in the direction of the arrow 81 while passing in the direction of the small arrows 91 into layers 47 and the capillary spaces between said layers.

It may now be assumed that liquid suddenly hits the center of the pad, i.e. at the level of arrow 81a in FIG. 15. When the layer-free space 61 at the level of the arrow 81a and the adjacent capillary spaces 71 are filled, and when the liquid does not enter sufficiently fast into the adjacent layer 47, the liquid will first be distributed into the next two spaces 61 and 71 and will be received thereby. In this way the liquid partially proceeds and enters through layers 4 at the level of the windings 101. It will be obvious that with the sudden occurrence of liquid in the center of the pad, always the respective adjacent spaces 61, 71 are filled with liquid and that the liquid will then be distributed to the margin of the pad. The liquid absorption is in this way considerably increased over that of heretofore known pads.

With the embodiment according to FIG. 16, the layers 48 are likewise of a serpentine contour and arranged within the envelope. However, the layers are from the center M of the pad inclined in different direction toward opposite sides. Also the angle of inclination between adjacent layer sections may be selected differently.

FIG. 17 once more illustrates on an enlarged scale the receiving space 61 and the capillary space 71. The arrows 91 symbolize entry of the liquid whereas the arrows 110 indicate that the liquid is now able to distribute itself in the capillary space 120 between the layers 47. As will be evident from the drawing, spaces 61, 71 are covered with regard to the pad side 22 which is remote from the treatment side. This is effected by the curved portions 170 of the layers. Consequently, the liquid, from the said space, cannot directly pass to the pad side 22.

According to still another embodiment illustrated in FIG. 18, one or more layers may be employed which are composed of two outer cellulose wadding layers 213, 214 and a cellulose flake layer 215.

FIG. 19 illustrates how these layers of cellulose wadding and cellulose flakes are designed and arranged. Also in this instance a space 260 with adequate capillary space 270 is formed from where the liquid in the direction of the arrows 290 passes into the cellulose flake layer. The liquid will also in this instance distribute itself in the direction of the arrows 211. If desired, a plurality of such combined cellulose wadding and cellulose flake layers may be arranged in the manner described above.

It is, of course, to be understood that the present invention is, by no means, limited to the particular embodiments illustrated in the drawings but also comprises any modifications within the scope of the appended claims.

What I claim is:

1. An absorption pad, especially for the treatment of wounds and for infant care, which includes: an outer cover of moisture resistant material having that one side thereof liquid permeable which is intended to be placed on the human body, and a plurality of superimposed layers of moisture absorbing cellulose material arranged within said cover so as to leave at least one area on the inside of said one side of said cover layer and to define with said area moisture receiving chamber means, said chamber means extending from said one side at least over a portion of the height of said pad, and said layers of moisture absorbing cellulose material having at least their major portions substantially parallel to said one side while the space between said layers communicates with said chamber means and forms capillary passage means extending from said chamber means toward the side walls of said pad between and into said layers of moisture absorbing cellulose material.

2. A pad according to claim 1, in which said chamber means extend at least partially over the width of said pad.

3. A pad according to claim 1, in which said chamber means extend at least partially over the length of said pad.

4. A pad according to claim 1, in which said layers of moisture absorbing cellulose material have their end portions folded toward each other while the ends of at least some of said layers are spaced from each other in the planes of the folded end portions of said layers so as to confine said chamber means between said spaced ends.

5. A pad according to claim 4, in which that side of said cover which is located opposite said one side thereof is covered relative to said chamber means by a portion of said layers.

6. A pad according to claim 1, in which said chamber means are confined in part by layers of moisture absorbing cellulose material extending along planes substantially parallel to said one side but spaced therefrom and in part by pairs of additional layers superimposed upon each other and adjacent said one side and substantially parallel thereto, each pair of layers having its respective layers located in substantially one and the same plane while confining therebetween a portion of said chamber means.

7. A pad according to claim 1, in which said one side of said cover within the region of said chamber means has areas adapted to permit liquid to pass therethrough easier than through portions adjacent said areas.

8. A pad according to claim 1, in which at least some of the layers of moisture absorbing cellulose material which confine said chamber means include cellulose wadding and cellulose flakes.

9. A pad according to claim 8, in which the layers comprising cellulose wadding and cellulose flakes comprise at least two layers of cellulose wadding and a layer of cellulose flakes therebetween.

10. A pad according to claim 1, in which said layers include at least one layer of cellulose flakes having the top and bottom thereof covered by cellulose wadding.

11. A pad according to claim 1, in which said layers of cellulose material include at least two layers of cellulose flakes and at least one layer of cellulose wadding separating said layers of cellulose flakes from each other.

12. A pad according to claim 11, in which a composite layer of cellulose wadding and cellulose flakes has a weight not exceeding 250 grammes per square meter.

References Cited

UNITED STATES PATENTS

| | | | |
|---|---|---|---|
| 810,133 | 1/1906 | Green | 128—296 |
| 810,135 | 1/1906 | Green | 128—296 |
| 2,632,443 | 3/1953 | Lesher | 128—296 |
| 2,952,259 | 9/1960 | Burgeni | 128—290 |
| 3,036,573 | 5/1962 | Voigtman et al. | 128—287 |
| 3,043,301 | 7/1962 | Plantinga et al. | 128—156 |
| 3,046,986 | 7/1962 | Harwood | 128—290 |
| 3,143,113 | 8/1964 | Mills | 128—290 |
| 3,343,543 | 9/1967 | Glassman | 128—290 |

FOREIGN PATENTS 664,988  9/1938  Germany.

CHARLES F. ROSENBAUM, *Primary Examiner.*

U.S. Cl. X.R.

128—156